United States Patent [19]

Bourekas et al.

[11] Patent Number: 5,636,363
[45] Date of Patent: Jun. 3, 1997

[54] HARDWARE CONTROL STRUCTURE AND METHOD FOR OFF-CHIP MONITORING ENTRIES OF AN ON-CHIP CACHE

[75] Inventors: Philip A. Bourekas, San Jose; Yeshayahu Mor, Cupertino; Scott Revak, Castro Valley, all of Calif.

[73] Assignee: Integrated Device Technology, Inc., Santa Clara, Calif.

[21] Appl. No.: 715,525

[22] Filed: Jun. 14, 1991

[51] Int. Cl.$^6$ .................................................. G06F 12/08
[52] U.S. Cl. .................................................. 395/465
[58] Field of Search ........................... 395/425, 575; 364/DIG. 1

[56] References Cited

U.S. PATENT DOCUMENTS

4,190,885  2/1980  Joyce et al. .................. 395/183.18
4,686,621  8/1987  Keeley et al. ................. 395/183.16
4,991,090  2/1991  Emma et al. .................. 395/185.03

Primary Examiner—Tod R. Swann
Assistant Examiner—J. Peikari
Attorney, Agent, or Firm—Skjerven, Morrill, MacPherson, Franklin & Friel

[57] ABSTRACT

A structure and a method for directing execution of instructions are provided in a microprocessor with an on-chip cache memory. In one embodiment, the microprocessor provides a debug mode, which is activated by a signal on a mode pin. In the debug mode, when a signal is received on a second mode pin indicating that an instruction is to be provided on the memory bus is desired, a cache miss is generated at the next instruction fetch. Thus, the processor is forced to fetch the next instruction from main memory. The instruction is then provided on the memory bus as though it is fetched from the main memory in response to the read cycle resulting from the cache miss.

4 Claims, 7 Drawing Sheets

HARDWARE CONTROL STRUCTURE AND METHOD FOR OFF-CHIP MONITORING ENTRIES OF AN ON-CHIP CACHE

FIELD OF THE INVENTION

This invention relates to integrated circuits, and in particular, relates to the design of microprocessors.

DESCRIPTION OF RELATED ART

Exploiting the property of locality of memory references, cache memories have been successful in achieving high performance in many computer systems. In the past, cache memories of microprocessor-based systems are provided off-chip using high performance memory components. This is primarily because the amount of silicon area necessary to provide an on-chip cache memory of reasonable performance would have been impractical, since increasing the size of an integrated circuit to accommodate a cache memory will adversely impact the yield of the integrated circuit in a given manufacturing process. However, with the density achieved recently in integrated circuit technology, it is now possible to provide on-chip cache memory economically.

In a computer system with a cache memory, when a memory word is needed, the central processing unit (CPU) looks into the cache memory for a copy of the memory word. If the memory word is found in the cache memory, a cache "hit" is said to have occurred, and the main memory is not accessed. Thus, a figure of merit which can be used to measure the effectiveness of the cache memory is the "hit" ratio. The hit ratio is the percentage of total memory references in which the desired datum is found in the cache memory without accessing the main memory. When the desired datum is not found in the cache memory, a "cache miss" is said to have occurred and the main memory is then accessed for the desired datum. In addition, in many computer systems, there are portions of the address space which are not mapped to the cache memory. This portion of the address space is said to be "uncached" or "uncacheable". For example, the addresses assigned to input/output (I/O) devices are almost always uncached. Both a cache miss and an uncacheable memory reference result in an access to the main memory.

In the course of developing or debugging a computer system, it is often necessary to monitor program execution by the CPU or to interrupt one instruction stream to direct the CPU to execute certain alternate instructions. For example, a technique for testing a microprocessor in a system under development uses an in-circuit emulator (ICE) which monitors the instruction stream and where appropriate, takes control of the microprocessor by forcing the microprocessor to execute an alternative program. To achieve this end, the ICE monitors the signals on the microprocessor's pins. When a monitored instruction in the program execution is encountered, the ICE causes alternate instructions to be executed for such purpose as reading or altering the internal state of the CPU. Hence, when the cache memory is implemented off-chip, the transactions between the cache memory and the CPU can be monitored by the ICE via the microprocessor's pins on the off-chip bus between the cache memory and the CPU. However, when the cache memory is implemented on-chip, the transactions between the cache and the CPU occur on an internal on-chip bus, which cannot be probed from the pins of the integrated circuit. As a result, debugging operations using an ICE in a system with an on-chip cache memory can be very difficult.

When the on-chip cache memory achieves a high hit ratio, only the relatively infrequent accesses to main memory due to cache misses or references to uncacheable portions of memory can be monitored from the pins.

In the prior art, to provide a way for the ICE to monitor execution of the instruction stream, or to introduce alternative instructions into the CPU, designers of microprocessors with on-chip cache memory often provide means for disabling the on-chip cache, so that every instruction can be monitored from the off-chip bus between the main memory and the microprocessor. Debugging under a disabled cache, however, is a condition which does not reflect the intended operation of the microprocessor. Consequently, considerable overhead, which is especially undesirable for testing real time applications, is introduced into program execution. For such applications, it is often necessary to use, for example, a technique called a "shadow cache," i.e. an externally implemented cache memory which mirrors identically the operation of the on-chip cache. A technique such as a shadow cache, requires both expensive hardware and complex software.

In other instances in the debugging process, e.g. when a monitored instruction is encountered, it may be necessary for the ICE to probe the internal state of the microprocessor by interrupting the instruction stream and directing the microprocessor to execute certain other instructions. Since the microprocessor will attempt to fetch these instructions from the instruction cache, cache misses and refill operations may be generated. Consequently, when the ICE returns control to the microprocessor to continue execution of the interrupted instruction stream, the state of the cache is not the same as before the monitored instruction is encountered. Lacking a scheme for the ICE to take control of the internal cache transactions, certain failure modes may not be diagnosed.

SUMMARY OF THE INVENTION

In a microprocessor with an on-chip cache, a structure and a method are provided to direct execution of instructions provided on a memory bus between the microprocessor and the main memory. In accordance with the present invention, when a testing device desires to provide on the memory bus an instruction to be executed by the microprocessor, a cache miss signal is generated to force the processor to fetch the next instruction from the main memory. The instruction to be executed is then provided to the microprocessor as if the instruction is fetched from the main memory.

In one embodiment, the microprocessor provides a debug mode, which is activated by a signal on a mode pin. In the debug mode, when a signal is received on a second mode pin indicating that an instruction is to be provided on the memory bus, a cache miss is generated at the next instruction fetch. Thus, the processor is forced to fetch the next instruction from main memory. The external testing device then provides the instruction on the memory bus as though it is fetched from the main memory in response to the read cycle the microprocessor initiated as a result of the cache miss.

The present invention allows a testing device to take control of the microprocessor under test and directly provide the microprocessor with a sequence of instructions to execute, rather than having the microprocessor execute these instructions from cache memory. Consequently, the state of the microprocessor's cache before the testing device takes control can be preserved, if necessary.

The present invention is better understood upon consideration of the below detailed description and the accompanying drawings.

BRIEF DESCRIPTION OF THE DRAWINGS

FIG. 1b is a block diagram of the processor 101 of FIG. 1a.

DETAILED DESCRIPTION OF THE PREFERRED EMBODIMENTS

Figure 1A:
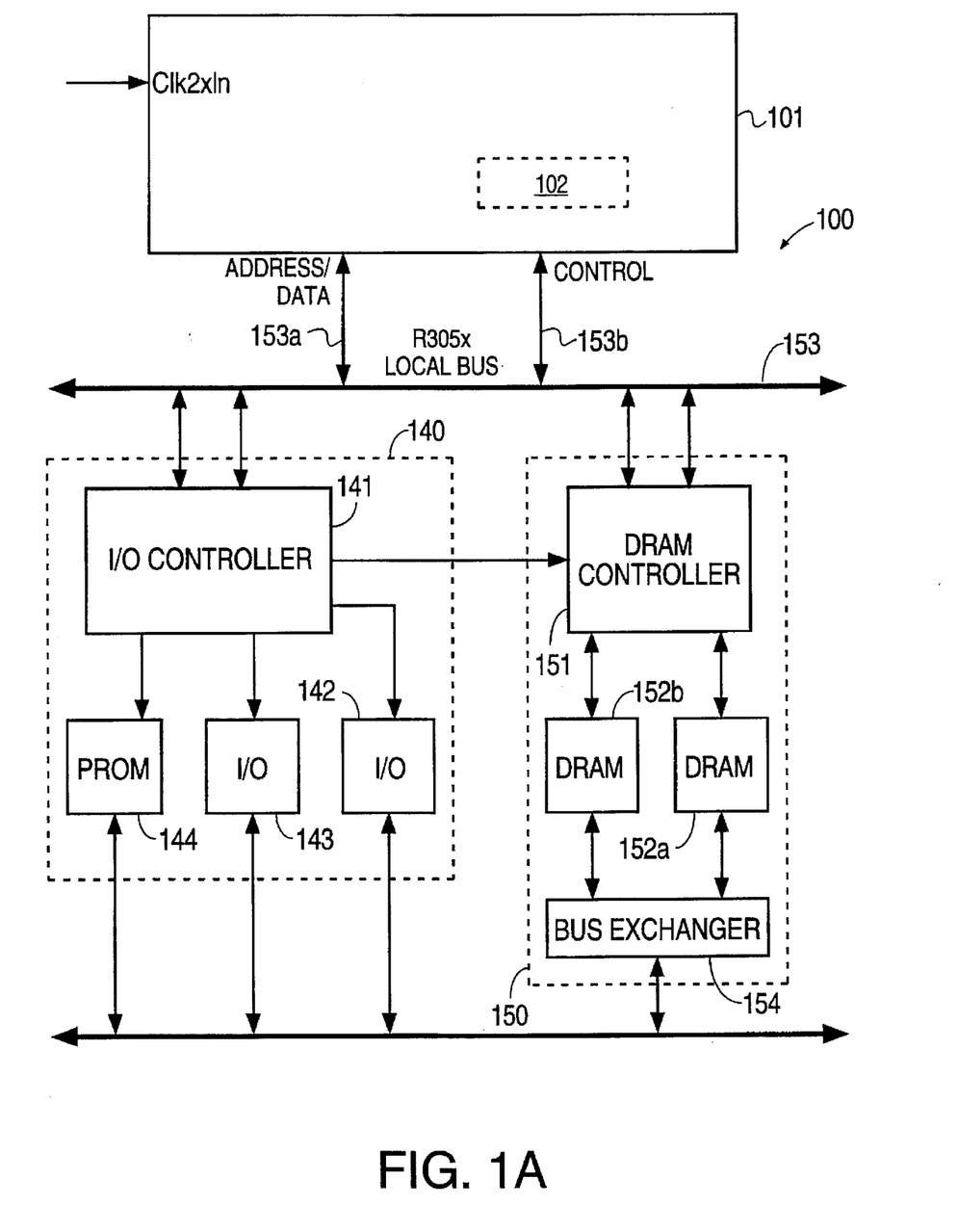
FIG. 1a shows a computer system 100 having a processor 101 with an on-chip instruction cache system 102 and a main memory system 150 external to the processor 101, in accordance with the present invention.

FIG. 1a shows, as an example, a computer system 100 having a processor 101 with an on-chip cache system 102 and a main memory system 150 external to processor 101, in accordance with the present invention. As shown in FIG. 1a, external or read and write memory ("main memory") system 150, which is interfaced to the processor 101 over a bus 153, comprises a dynamic random access memory (DRAM) controller 151, a main memory 152 implemented by banks 152a and 152b of DRAMs and a bus interface 154. In addition, the address space of computer system 100 is also used to access other memory-mapped computer devices such as I/O controller 141, I/O devices 142 and 143, and programmable read-only memory (PROM) 144. To facilitate reference, the memory-mapped devices other than the main memory system 150 defined above are collectively referred to as I/O system 140, even though read-only memories such as PROM 144 are often not considered part of the I/O system. I/O system 140 is also interfaced to the bus 153. Bus 153 comprises address/data bus 153a and control bus 153b. Memory data and memory addresses are time-multiplexed on the 32-bit address/data bus 153a. Other device configurations sharing the memory address space are also possible within the scope of the present invention.

Figure 1B:
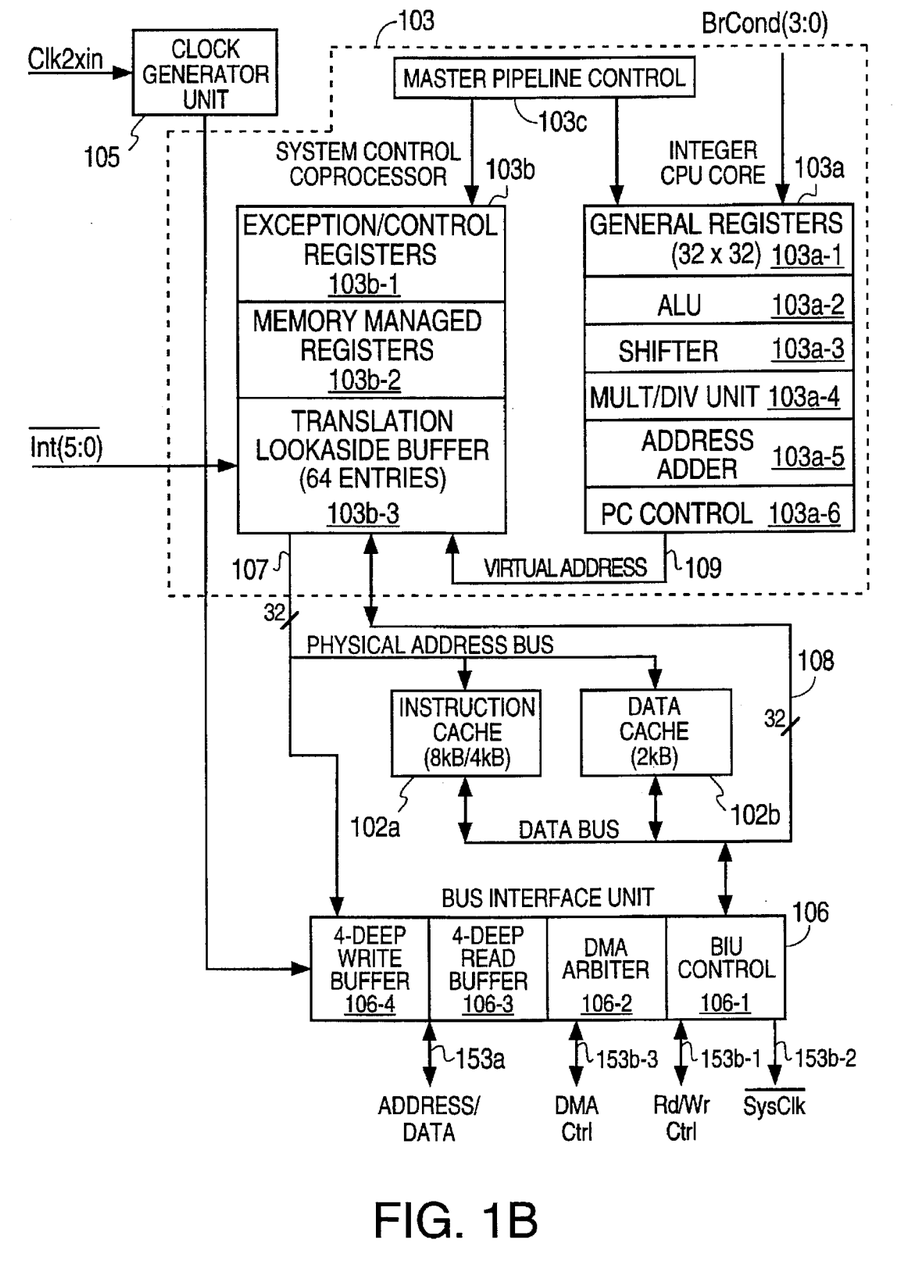

The organization of processor 101 is shown in FIG. 1b. As shown in FIG. 1b, processor 101 includes two co-processors 103a and 103b, controlled by a master pipeline control unit 103c. Coprocessor 103a is also referred to as the integer CPU, and includes 32 32-bit general registers 103a-1, an ALU 103a-2, a shifter 103a-3, a multiplication and division unit 103a-4, an address adder 103a-5, and program counter control unit 103a-6. Processor 103a executes the instruction set known as the MIPS-I Instruction Set Architecture (ISA). Coprocessor 103b, also known as the System Control Coprocessor, comprises exception/control registers 103b-1, a memory management registers unit 103b-2 and a translation look-aside buffer (TLB) 103b-3. The TLB unit 103b-3 provides a mapping between virtual and physical addresses. The TLB unit 103b-3 has a 64-entry look-up table to provide mapping between virtual and physical addresses efficiently. In this embodiment, the TLB unit 103b-3 is provided at the user's option. The TLB unit 103b-3 can be disabled. The above units of the coprocessors 103a and 103b can be implemented by conventional or any suitable designs known in the art. The coprocessor units 103a and 103b, and the pipeline control unit 103c are collectively known as the CPU core 103.

The cache system 102 of processor 101 comprises two cache memories 102a and 102b. Cache 102a is an instruction cache. In this embodiment shown, the capacity of cache 102a can be 4K or 8K bytes, and line and block refill size of four memory words each. Cache 102b is a data cache, and has a selectable block refill size of one or four memory words, a line size of one memory word, and a capacity of 2K bytes. Other cache, line and block refill sizes can be provided without departing from the scope of the present invention. Both the capacities of cache 102a and cache 102b, and their respective line and block refill sizes, are matters of design choice. In addition, it is also not necessary to provide separate data and instruction caches. A joint data and instruction cache is also within the scope of the present invention. The TLB unit 103b-3 receives on bus 109 a virtual address and provides to either cache 102a or cache 102b on bus 107 the corresponding physical memory address. Although cache accessing using virtual addresses is also possible, by using physical addressing in the instruction and data caches, the present embodiment simplifies software requirements and avoids the cache flushing operations necessary during a context switch in a virtually addressed cache. The cache addressing scheme is discussed below in conjunction with FIG. 2.

Bus interface unit (BIU) 106 interfaces processor 101 with the main memory 150 when a read or write access to main memory is required. BIU 106 comprises a 4-deep write buffer 106-4, a 4-deep read buffer 106-3, a DMA arbiter 106-2 and BIU control unit 106-1. BIU control unit 106-1 provides all control signals on bus 153b, which comprises buses 153b-1 to 153b-3 necessary to interface with the main memory 150 and the I/O system 140. Both addresses and data are multiplexed on the address/data bus 153a, and the control signals are provided on the $\overline{\text{Rd/Wr}}$ control bus 153b-1, the system clock signal 153b-2, and the DMA control bus 153b-3.

$\overline{\text{Rd/Wr}}$ control bus 153b-1 comprises pins Addr[3:2], which provides the least significant two bits of a memory word address, interface control signals $\overline{\text{Rd}}$(read), $\overline{\text{Wr}}$ (write), $\overline{\text{DataEn}}$ (data enable), $\overline{\text{Burst/WrNear}}$ (burst mode or "write near") and ALE (address latch enable), and diagnostic signals Diag[1:0]. The DMA control bus 153b-3 comprises DMA control signals on pins $\overline{\text{BusGnt}}$ (bus grant) and $\overline{\text{BusReq}}$ (bus request). The functions and protocols of the signals in busses 153b-1 add 153b-3 are described in "IDT79R3051™ Family Hardware User's Manual", which is available from Integrated Device Technology, Inc., Santa Clara, Calif., and which is hereby incorporated by reference in its entirety. The data/address bus 153a comprises pins AD[31:0] which are multiplexed for sending addresses to the main memory 150 and for sending or receiving data to and from the main memory 150.

Figure 2:
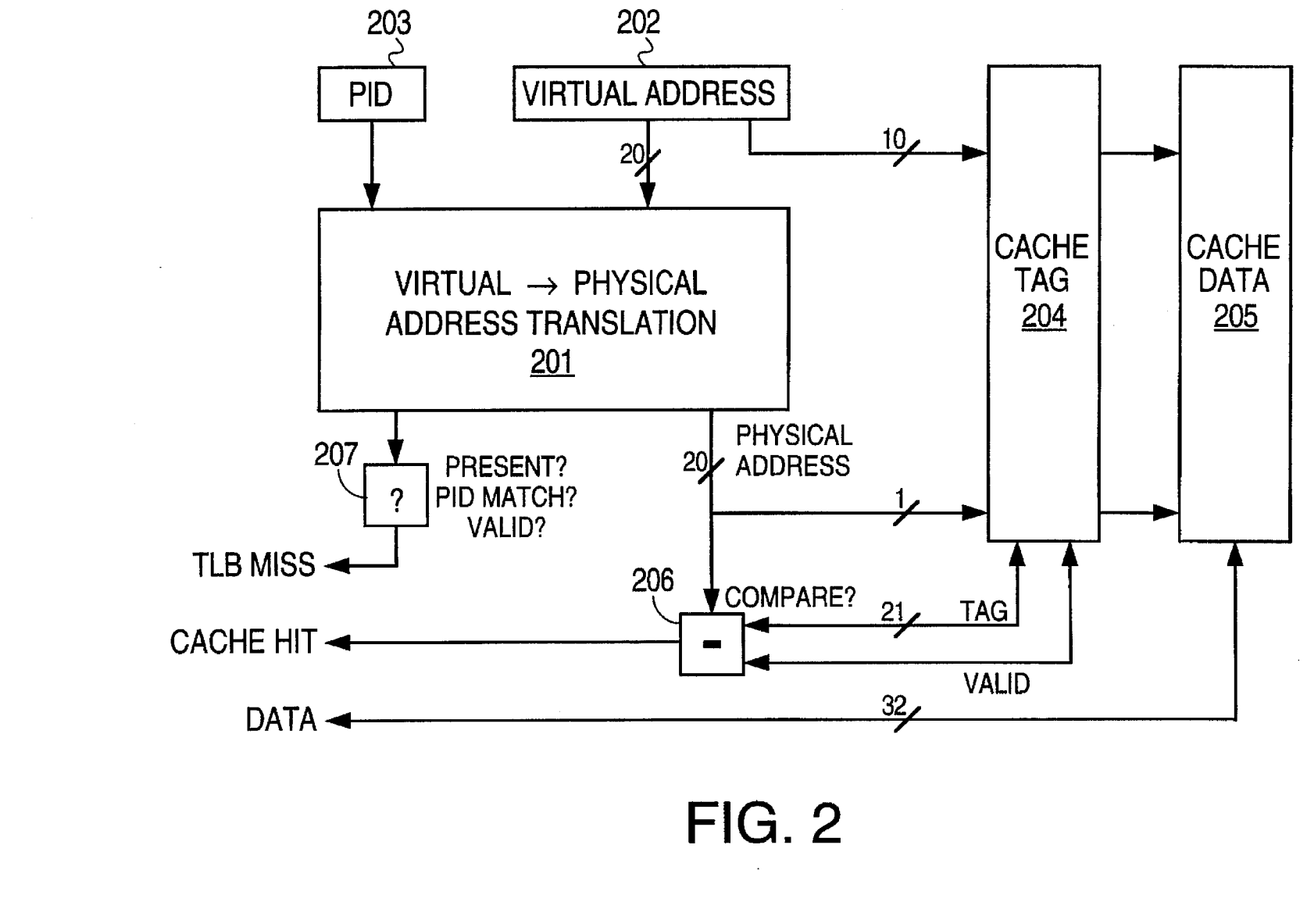
FIG. 2 is a block diagram showing the addressing scheme used in instruction cache 102a of the cache system 102 of FIGS. 1a and 1b.

FIG. 2 is a block diagram showing the addressing scheme used in the instruction cache 102a of the cache system 102, which is shown in FIGS. 1a and 1b. As shown in FIG. 2, the higher order 20 bits of a virtual address (generated by CPU core 103, as shown in FIG. 1b), which is represented by block 202, is provided to the cache addressing mechanism represented by block 201. The remaining 10 bits of the memory word address are common between the virtual and the physical addresses. (The lowest two bits are byte addresses, which are not used in cache addressing.) These 10 common bits are directly provided to index into the cache memory 102a, represented by blocks 204 and 205. Block 205 represents the data portion of the cache line, which comprises four 32-bit memory words in this embodiment. Block 204 represents the "tag" portion of the cache data word; this tag portion contains both a "valid" bit and the higher order 20 bits of the memory word addresses of the data words stored in the cache line. (Since the addresses of memory words within the cache line are contiguous, the higher order 20 bits are common to all of the memory words in the cache line). The valid bit indicates that the cache word contains valid data. Invalid data may exist if the data in the cache does not contain a current memory word. This condition may arise, for example, after a reset period.

Each virtual address is associated with a particular process identified by a unique "process id" PID, which is represented by block 203. Block 201 represents the virtual address to the physical address translation, which is performed using the TLB unit 103b-3 when the TLB is present. (FIG. 1b.) When the TLB is present, a TLB miss occurs if either a mapping between the virtual address and the corresponding physical address cannot be found in the 64 entries of the TLB unit 103b-3, the PID stored in the TLB unit 103b-3 does not match the PID of the virtual address, or if the valid bit in the data word is not set. Block 207 represents the determination of whether a TLB miss has occurred. The TLB miss condition raises an exception condition, which is handled by CPU core 103. If a virtual address to physical address mapping is found, the higher order 20 bits of the physical memory word address is compared (block 206) with the memory address portion of the tag. The valid bit is examined to ensure the data portion of the cache line contains valid data. If the comparison (block 206) indicates a cache hit, the selected 32-bit word in the cache line is the desired data.

If a cache miss is indicated, BIU 106 is invoked and CPU core 103 stalls until BIU 106 indicates that the requested data is available. A cache miss can also be generated when the memory access is to a "uncacheable" portion of memory. When BIU 106 receives a datum from main memory, the CPU core 103 executes either a "refill", a "fix-up", or a "stream" cycle. In a refill cycle, an instruction datum received (in the read buffer 106-3) is brought into the cache 102a. In a fix-up cycle, the CPU core 103 transitions from a refill cycle to execute the instruction brought out of the read buffer 106-3. In a stream cycle, the CPU core 103 simultaneously refills cache memory 102a and executes the instruction brought out of the read buffer 106-3. For uncacheable references, the CPU core 103 executes a fixup cycle to bring out the fetched memory word from the read buffer 106-3, but the uncacheable memory word is not brought into the cache memory 102a. Otherwise, the CPU core 103 executes refill cycles until the miss address is reached. At that time, a fixup cycle is executed. Subsequent cycles are stream cycles until the end of the 4-memory word block is reached and normal run operation resumes. If sequential execution is interrupted, e.g. a successful branch condition, refill cycles are executed to refill the cache before execution is resumed at the branch address.

The operation of the data cache 102b is similar to that of instruction cache 102a, except that only one fixup cycle is used after one or four refill cycles, depending upon the refill block size selected. Because the size of the data cache is 2k bytes, a 21-bit "tag" is required. Hence, because of the different sizes of the data and instruction caches, the data cache's tag is larger than the instruction cache's tag by 1 bit. In order to have the data and instruction caches share a common cache addressing scheme, the instruction cache routes one of the lower order address bits back as a tag bit, so as to appear as if the tag portion of the instruction cache is 21-bit.

Figure 3:
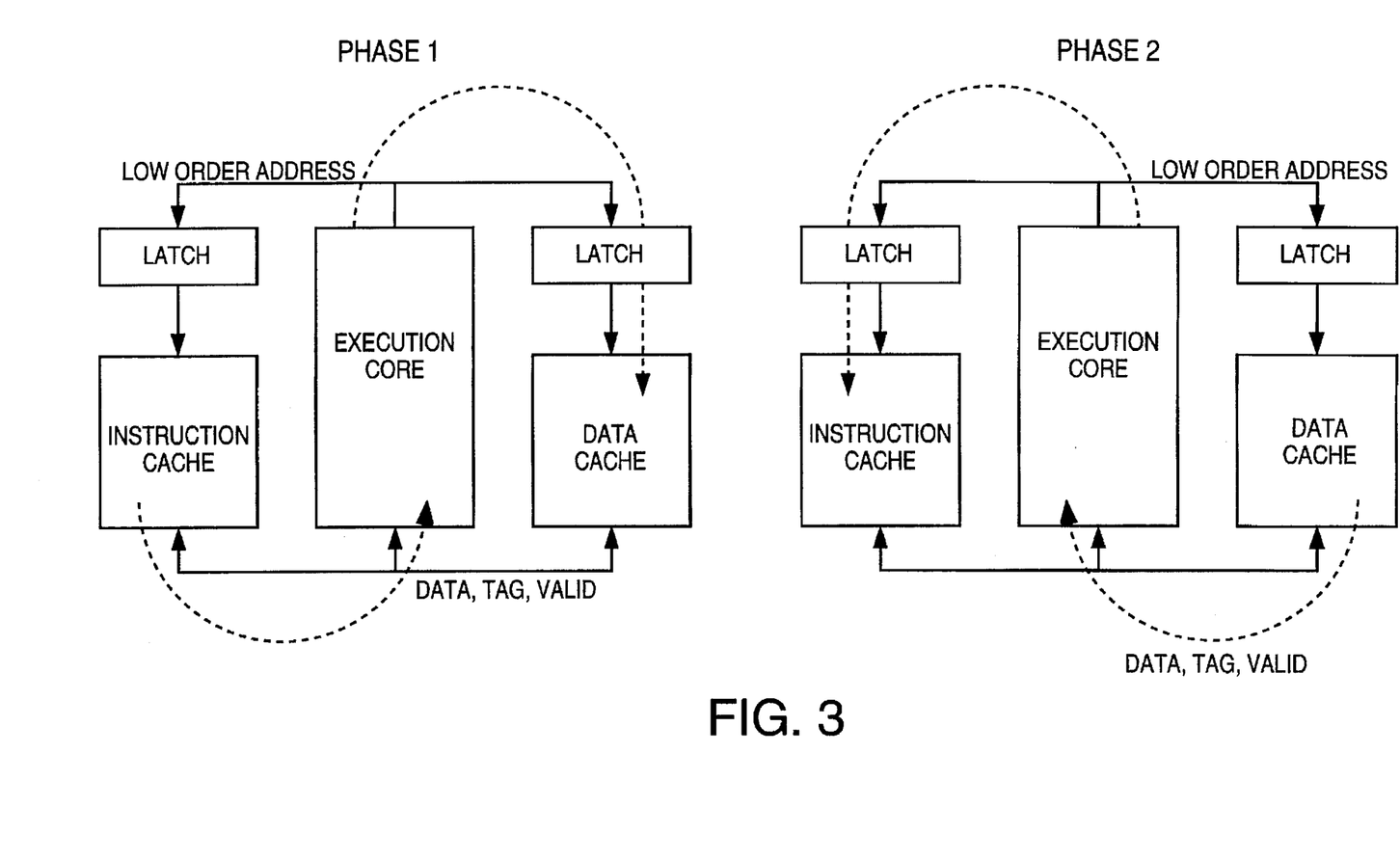
FIG. 3 shows a "run" cycle of the CPU core 103.

The execution of an instruction in the CPU core 103 is called a "run" cycle. The run cycle, which comprises two phases, is illustrated by FIG. 3. As shown on the left hand side of FIG. 3, during the first phase ("data phase"), a data cache (cache 102b) address is presented and a previous instruction cache (cache 102a) read is completed. During the second phase (the "instruction" phase), data found resident at the data cache address presented in the first phase is read into the CPU core 103, and an address corresponding to the next instruction is issued to instruction cache 102a.

Figure 4:
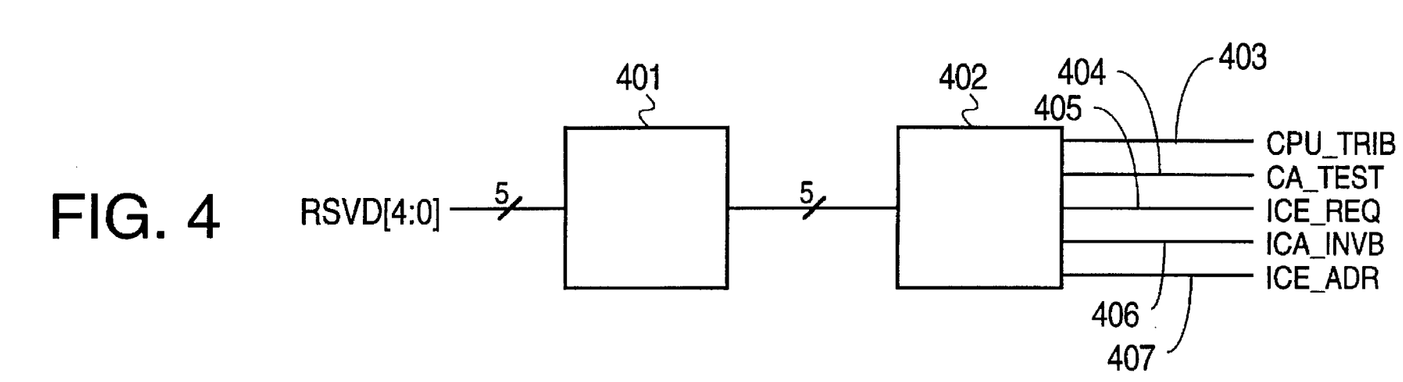
FIG. 4 shows a circuit 400 receiving input signals RSVD [4:0] into processor 101 of FIGS. 1a and 1b; circuit 400 provides an internal signal ICE_INVB, which indicates that a cache miss for the purpose of "jamming" instructions into the CPU core 103 is desired.

In this embodiment, processor 101 is further provided with five "reserved pins" RSVD[4:0], for receiving five signals used for testing purposes. FIG. 4 shows the signal on each of the pins RSVD[4:0] being received by input buffers 401, which is decoded by decoding logic 402 into five signals 403–407, respectively labelled CPU_TRIB, CA_TEST, ICE_REQ, ICA_INVB, and ICE_ADDR. In this embodiment, when the signal on the RSVD[2] pin is logic high, and the signals on the RSVD[3:4] pins are at logic low, the processor 101 is said to be in "debug" mode. In debug mode, the ICE ADDR signal is asserted. Furthermore, the ICE_INVB signal is asserted if the signal on the RSVD[1] pin is also asserted during debug mode. The ICE ADDR signal on terminal 407, which is asynchronous, indicates that echoing the signals on internal bus 108, which is between the CPU core 103 and the caches 102, is desired. A structure and a method to provide signals of an internal cache bus to be monitored at the external pins are described in copending Application entitled "Structure and Method for Monitoring an internal Cache", by P. Bourekas et al, Ser. No. 07/715,526, filed on the same day of the present Application, attorney docket number M-1619 US, and which is hereby incorporated by reference in its entirety. The ICA INVB signal on terminal 406, which is synchronized with respect to clock signals SysClk, SysOut1 and SysOut2, indicates that a forced cache miss is desired. The ability to monitor internal bus signals and the ability to force execution of alternative instructions are important features necessary to support the use of testing and debugging devices, such as an ICE.

Figure 5:
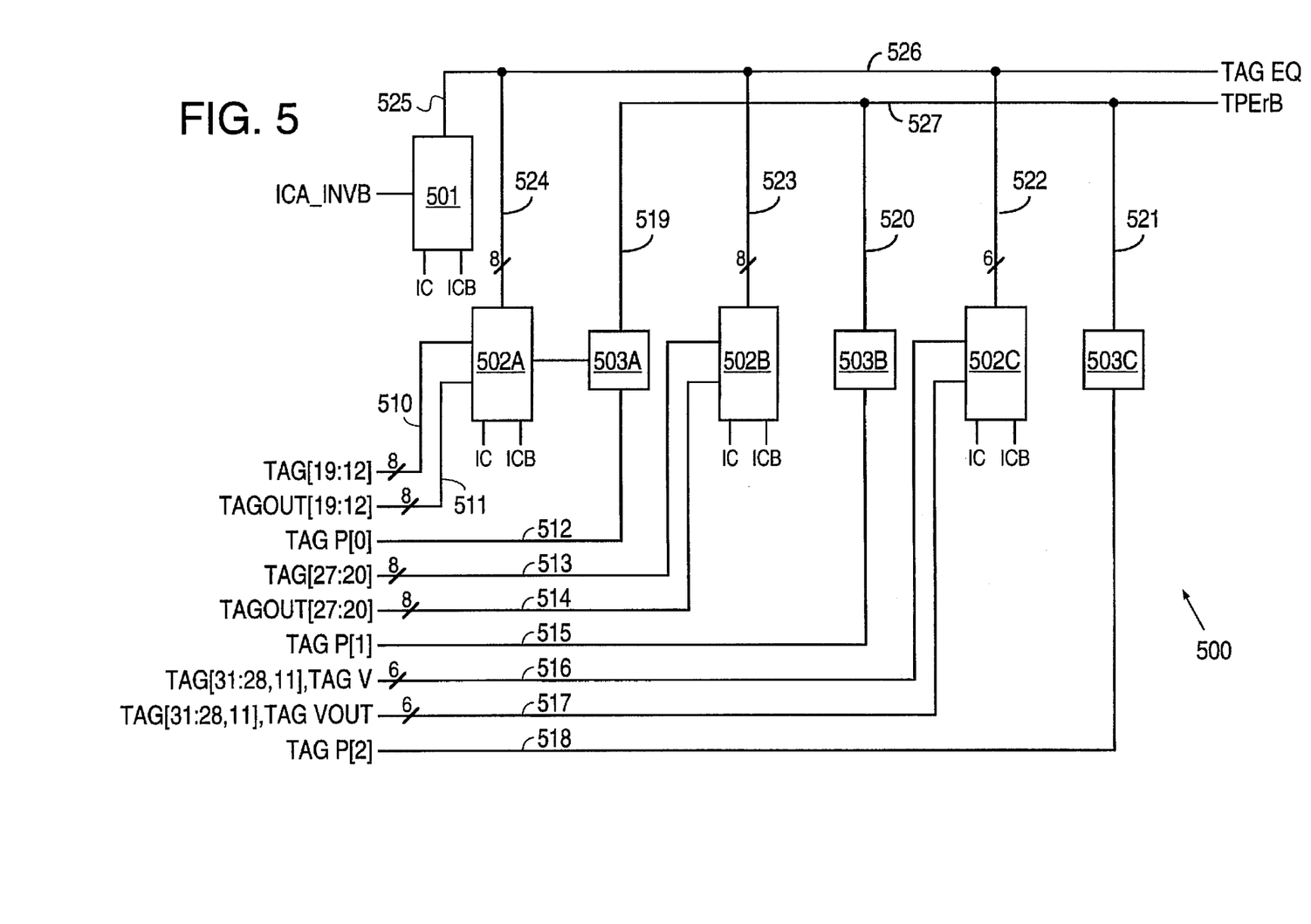
FIG. 5 is a block diagram of a cache tag comparison circuit 500, suitable for use in the embodiment shown in FIGS. 1a and 1b. Circuit 500 includes a circuit 501 for forcing a cache miss, when an instruction is to be "jammed" via the address/data bus 153a for execution in the CPU core 103, in accordance with the present invention.

While the ICA_INVB signal (sampled at the falling edge of the clock signal $\overline{SysClk}$) is asserted under the debug mode, every cache reference to the instruction cache 102a results in a cache miss, so that a read operation must be initiated to fetch the next instruction from the main memory system 150. Because other bus activities may occur (e.g. write access to main memory), the RSVD[1] signal should be held (hence, the ICA_INVB signal is held also) until a read operation is detected on the $\overline{Rd/Wr}$ control bus 153b-1. The cache miss is generated by the circuit 500 shown in block diagram form in FIG. 5. As shown in FIG. 5, circuit 500 comprises comparators 502a, 502b and 502c, parity checkers 503a, 503b and 503c, and pull-down circuit 501. Each comparator compares corresponding input bits from two sources. As shown in FIG. 5, comparator 502a receives on 8-bit busses 510 and 511 respectively 8-bit quantities Tag[19:12] and TagOut[19:12], comparator 502b receives on 8-bit busses 513 and 514 respectively 8-bit quantities Tag[27:20] and TagOut[27:20], and comparator 502c receives on 6-bit busses 516 and 517 respectively 6-bit quantities Tag[31:28,11] and TagV, and TagOut[31:28,11] and TagVOut. The bits of Tag[31:11] are the higher 21 bits in the address of the instruction or memory word to be fetched. The bits of TagOut[31:11] are the 21 bits found in the tag portion of the word in the cache memory 102 which is found using the lower 10 bits of the memory address. In addition, TagV is the input valid bit, and TagVOut is the valid bit in the tag portion of word found in the cache memory 102. If every pair of corresponding bits in Tag [31:11] and TagOut[31:11] are identical, and the bits TagV and TagVOut are both asserted, then a cache hit is indicated. Otherwise, a cache miss is indicated. In this embodiment, the comparators 502a, 502b and 502c provides a result bit for each pair of corresponding bits. All the result bits are tied in an open-collector fashion to the signal line 526, which is labelled "TagEq." The result bits generated by comparators 502a, 502b, and 502c are respectively represented by the busses 524, 523 and 522. If any pair of corresponding bits compared in any of the comparators 502a, 502b and 502c are not identical, the corresponding result bit is pulled to a logic low voltage level, so that the output TagEq signal on line 526 is also pulled to logic low.

Also shown in FIG. 5 are parity checkers 503a, 503b and 503c, which are each used to determine if a parity error occurred in the bits compared by the comparator associated with the parity checker. Each parity checker receives a parity bit set according to the values of the bits for which parity is checked. Thus, parity checker 503a ensures the integrity of bits TagOut[31:28,11] and TagVOut using parity bit TagP[2] on terminal 518. Likewise, parity checker 503b and 503c ensure the integrity of bits TagOut[27:20] and TagOut [19:12], using parity bits TagP[1] on terminal 515 and TagP[0] on terminal 512 respectively. If a parity error is detected by any of the parity checkers 502a, 502b and 502c, the corresponding one of the parity checker output signals 519, 520 and 521 is pulled to logic low voltage. The output signals 519, 520 and 521 are also tied in open-collector fashion to provide the output error signal TPErB (tag parity error) on terminal 527, So that any parity error detected by the parity checkers 502a, 502b, and 502c will pull signal TPErB to logic low voltage. In this embodiment, the parity checkers 503a, 503b, and 503c are disabled because the increased reliability is deemed not necessary for the intended purposes. However, should future applications require the increased reliability of parity checking, these parity checkers 503a–503c can be made available. Parity checkers and comparators of FIG. 5 can be implemented by conventional or other suitable circuits performing the functions described above.

As shown in FIG. 5, the signal TagEq on terminal 526 can also be pulled to logic low by the circuit 501, in response to input signal ICA_INVB. When the reserved pin RSVD[1] is asserted during debug mode, i.e. when ICA_INVB is asserted, the output terminal 525 is pulled to logic low by circuit 501, so that the signal TagEq indicates a cache miss on terminal 526, regardless of whether the corresponding tag bits in Tag[31:11], TagOut[31:11], TagV and TagVOut are matched. When the read signal is detected on the $\overline{Rd/Wr}$ control bus 153b-1, the ICE can take control and "jam" a sequence of instructions on to the address/data bus 153a for the CPU core 103 to execute. In this embodiment, it is the responsibility of the ICE to restore by software operations the cache memory to the state before the ICE took control. This can be accomplished by the ICE keeping track of the cache locations which are changed by the execution of the jammed instructions. These changed locations in the instruction cache 102a may be restored by, for example, jamming "store" instructions into the CPU core 103.

Figure 6:
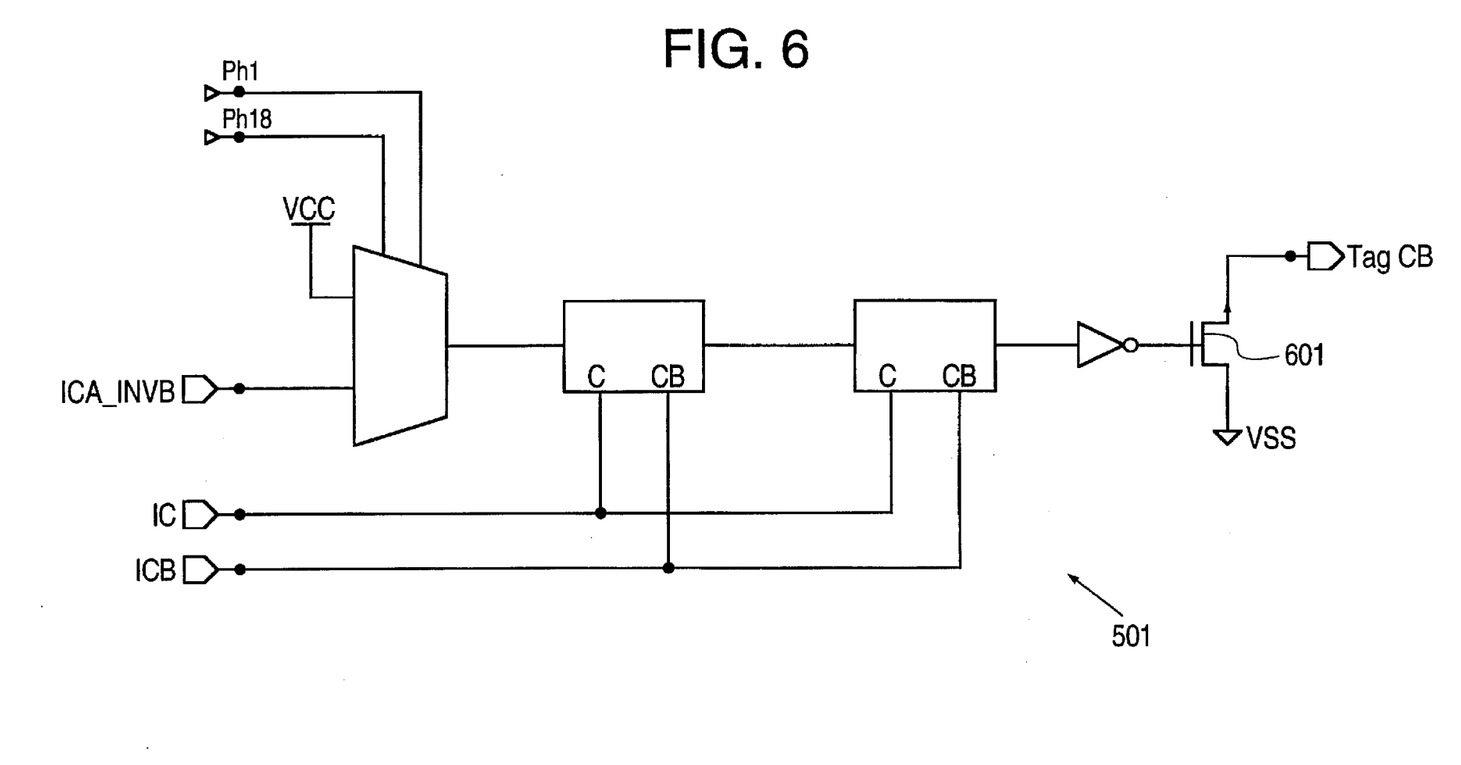
FIG. 6 is a schematic diagram of circuit 501 shown in FIG. 5 for forcing a cache miss.

Circuit 501 is shown in further detail in FIG. 6. As shown in FIG. 6, when the signal ICA_INVB is asserted, transistor 601 is turned on to pull the output signal TagCB to the logic low voltage of VSS. The signal TagCB is tied to terminal 526 in the open-collector fashion. Hence, asserting ICA_INVB pulls the signal TagEq to logic low.

The above detailed description is provided to illustrate the specific embodiments provided above, and not intended to be limiting the present invention. Many modifications and variations within the scope of the present invention are possible. The present invention is defined by the following claims.

We claim:

1. A structure for monitoring an on-chip cache in a microprocessor, said microprocessor having a plurality of pins for accessing a main memory, comprising:
   a control pin for receiving into said microprocessor a signal indicating an instruction is to be provided to said microprocessor via said pins;
   a circuit receiving and responding to said indicating signal for generating a cache miss signal to prevent said microprocessor from accessing said on-chip cache for a next instruction;
   a circuit receiving said cache miss signal for initiating a read access operation at said main memory to retrieve said next instruction; and
   a circuit for receiving into said microprocessor an instruction provided at said plurality of pins.

2. A structure as in claim 1, wherein said circuit for generating a cache miss signal comprises a circuit for comparing an address of said main memory with a cache tag stored in said on-chip cache.

3. A method for monitoring an on-chip cache in a microprocessor, said microprocessor having a plurality of pins for sending and receiving data and control signals to and from a main memory, comprising the steps of:
   receiving a signal into said microprocessor indicating an instruction is to be provided to said microprocessor via said pins;
   responding to said indicating signal by generating a cache miss signal to prevent said microprocessor from accessing said on-chip cache for a next instruction;
   receiving said cache miss signal and initiating a read access operation at said main memory to retrieve said next instruction; and
   receiving into said microprocessor an instruction provided at said plurality of pins.

4. A method as in claim 3, wherein said step of responding to said indicating signal includes a step for generating a cache miss signal when a comparison between an address of said main memory and a cache tag stored in said on-chip cache does not yield a match condition.

* * * * *